US011810363B2

(12) United States Patent
Lota et al.

(10) Patent No.: US 11,810,363 B2
(45) Date of Patent: Nov. 7, 2023

(54) SYSTEMS AND METHODS FOR IMAGE PROCESSING USING MOBILE DEVICES

(71) Applicant: Toyota Motor North America, Inc., Plano, TX (US)

(72) Inventors: Charan Lota, Frisco, TX (US); Jaya Bharath R. Goluguri, McKinney, TX (US)

(73) Assignee: Toyota Motor North America, Inc., Plano, TX (US)

( * ) Notice: Subject to any disclaimer, the term of this patent is extended or adjusted under 35 U.S.C. 154(b) by 323 days.

(21) Appl. No.: 16/263,444

(22) Filed: Jan. 31, 2019

(65) Prior Publication Data

US 2020/0250441 A1 Aug. 6, 2020

(51) Int. Cl.
| | |
|---|---|
| *G06V 20/58* | (2022.01) |
| *H04W 4/02* | (2018.01) |
| *H04W 4/40* | (2018.01) |
| *B60W 50/02* | (2012.01) |
| *G06V 20/05* | (2022.01) |

(52) U.S. Cl.
CPC ......... *G06V 20/05* (2022.01); *B60W 50/0205* (2013.01); *G06V 20/582* (2022.01); *H04W 4/025* (2013.01); *H04W 4/40* (2018.02)

(58) Field of Classification Search
CPC . G06K 9/00805; G06K 9/00818; H04W 4/40; H04W 4/025; H04W 48/18; H04W 84/005; H04W 88/06; B60W 50/0205; H04L 67/125; H04L 67/04; H04L 67/12
USPC .......................................................... 348/148
See application file for complete search history.

(56) References Cited

U.S. PATENT DOCUMENTS

| | | | |
|---|---|---|---|
| 6,606,658 B1 * | 8/2003 | Uematsu ............... | H04L 43/045 |
| | | | 709/223 |
| 8,935,656 B2 | 1/2015 | Dandia et al. | |
| 9,123,186 B2 | 9/2015 | Ricci | |
| 9,173,100 B2 | 10/2015 | Ricci | |
| 9,428,127 B2 * | 8/2016 | Cooper ................. | B60R 16/037 |
| 9,688,199 B2 * | 6/2017 | Koravadi ............... | B60Q 9/008 |
| 9,934,492 B2 * | 4/2018 | Wilson .................. | B60W 50/02 |
| 9,946,531 B1 | 4/2018 | Fields et al. | |
| 10,007,559 B1 * | 6/2018 | Gaudlip ............... | H04L 41/0896 |

(Continued)

OTHER PUBLICATIONS

Ke Zhang, Yuming Mao, Supengleng, Yejun He, Yan Zhang, "Mobile-Edge Computing For Vehicular Networks", Magazine, pp. 36-44, URL: https://heim.ifi.uio.no/yanzhang/IEEEVTM2017.pdf, Apr. 21, 2017.

*Primary Examiner* — Christopher S Kelley
*Assistant Examiner* — Asmamaw G Tarko
(74) *Attorney, Agent, or Firm* — Dinsmore & Shohl LLP

(57) ABSTRACT

The system described herein includes a vehicle comprising one or more imaging devices configured to capture one or more images, and a first mobile computing device communicatively coupled to the vehicle. The first mobile computing device includes one or more processors; one or more memory modules; and machine readable and executable instructions that, when executed by the one or more processors, cause the first mobile computing device to: receive the one or more images including an external object from the vehicle; process the image to determine an identification of the external object; and transmit information about the identification of the external object to a remote server or the vehicle.

20 Claims, 6 Drawing Sheets

(56) References Cited

U.S. PATENT DOCUMENTS

| | | | |
|---|---|---|---|
| 10,032,431 B2 | 7/2018 | Wilde et al. | |
| 2013/0114849 A1* | 5/2013 | Pengelly | G06K 9/00979 |
| | | | 382/103 |
| 2014/0005860 A1 | 1/2014 | Chance | |
| 2015/0026312 A1* | 1/2015 | Othmer | H04W 48/18 |
| | | | 709/220 |
| 2016/0050264 A1* | 2/2016 | Breed | H04L 12/2825 |
| | | | 709/217 |
| 2017/0126810 A1* | 5/2017 | Kentley | H04L 67/125 |
| 2017/0279947 A1* | 9/2017 | Rajakarunanayake | H04L 67/12 |
| 2017/0339267 A1* | 11/2017 | Shan | H04M 1/72533 |
| 2017/0344010 A1* | 11/2017 | Rander | G06Q 50/28 |
| 2018/0075538 A1* | 3/2018 | Konrardy | G06Q 40/08 |
| 2018/0165527 A1* | 6/2018 | Park | G06K 9/6269 |
| 2018/0260401 A1* | 9/2018 | Agrawal | G06N 5/04 |
| 2019/0102636 A1* | 4/2019 | Koravadi | H04N 7/188 |
| 2019/0132555 A1* | 5/2019 | Chu | H04N 7/181 |
| 2019/0208111 A1* | 7/2019 | Wendel | H04N 5/2258 |
| 2019/0270459 A1* | 9/2019 | Williams | H04M 1/72569 |
| 2019/0295014 A1* | 9/2019 | Fagnant | G06Q 10/06311 |
| 2019/0311404 A1* | 10/2019 | Wasserman | G08G 1/093 |
| 2019/0340038 A1* | 11/2019 | Molloy | G06F 9/4881 |
| 2020/0056892 A1* | 2/2020 | Haque | G06K 9/6273 |

* cited by examiner

SYSTEMS AND METHODS FOR IMAGE PROCESSING USING MOBILE DEVICES

TECHNICAL FIELD

The present specification generally relates to vehicle systems for processing images, and more specifically, to vehicle systems for processing images captures by imaging devices using mobile computing devices in vehicles.

BACKGROUND

Some vehicles including sophisticated functions including, for example, autonomous driving, external object detection, etc. These functions require significant computing resources. Vehicles having limited computing resources may not be able to perform these functions in real time or in an expedited way.

Accordingly, a need exists for vehicle systems that utilize computing resources of external computing devices.

SUMMARY

In one embodiment, a system includes a vehicle comprising one or more imaging devices configured to capture one or more images, and a first mobile computing device communicatively coupled to the vehicle. The first mobile computing device includes one or more processors; one or more memory modules; and machine readable and executable instructions that, when executed by the one or more processors, cause the first mobile computing device to: receive the one or more images including an external object from the vehicle; process the image to determine an identification of the external object; and transmit information about the identification of the external object to a remote server or the vehicle.

In another embodiment, a vehicle includes one or more imaging devices configured to capture one or more images; one or more processors; one or more memory modules; machine readable and executable instructions that, when executed by the one or more processors, cause the vehicle to: initiate communication with a first mobile computing device; capture images with the one or more imaging devices; receive information about available computing resources of the first mobile computing device; compare available computing resources of the vehicle to the available computing resources of the first mobile computing device; and transmit the one or more images captured by the one or more imaging devices to the first mobile computing device based on the comparison of the available computing resources of the vehicle and the available computing resources of the first mobile computing device.

In yet another embodiment, a method includes receiving, by a mobile computing device, one or more images including an external object from a vehicle; processing, by the mobile computing device, the one or more images to determine an identification of the external object; and transmitting, by the mobile computing device, information about the identification of the external object to a remote server.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
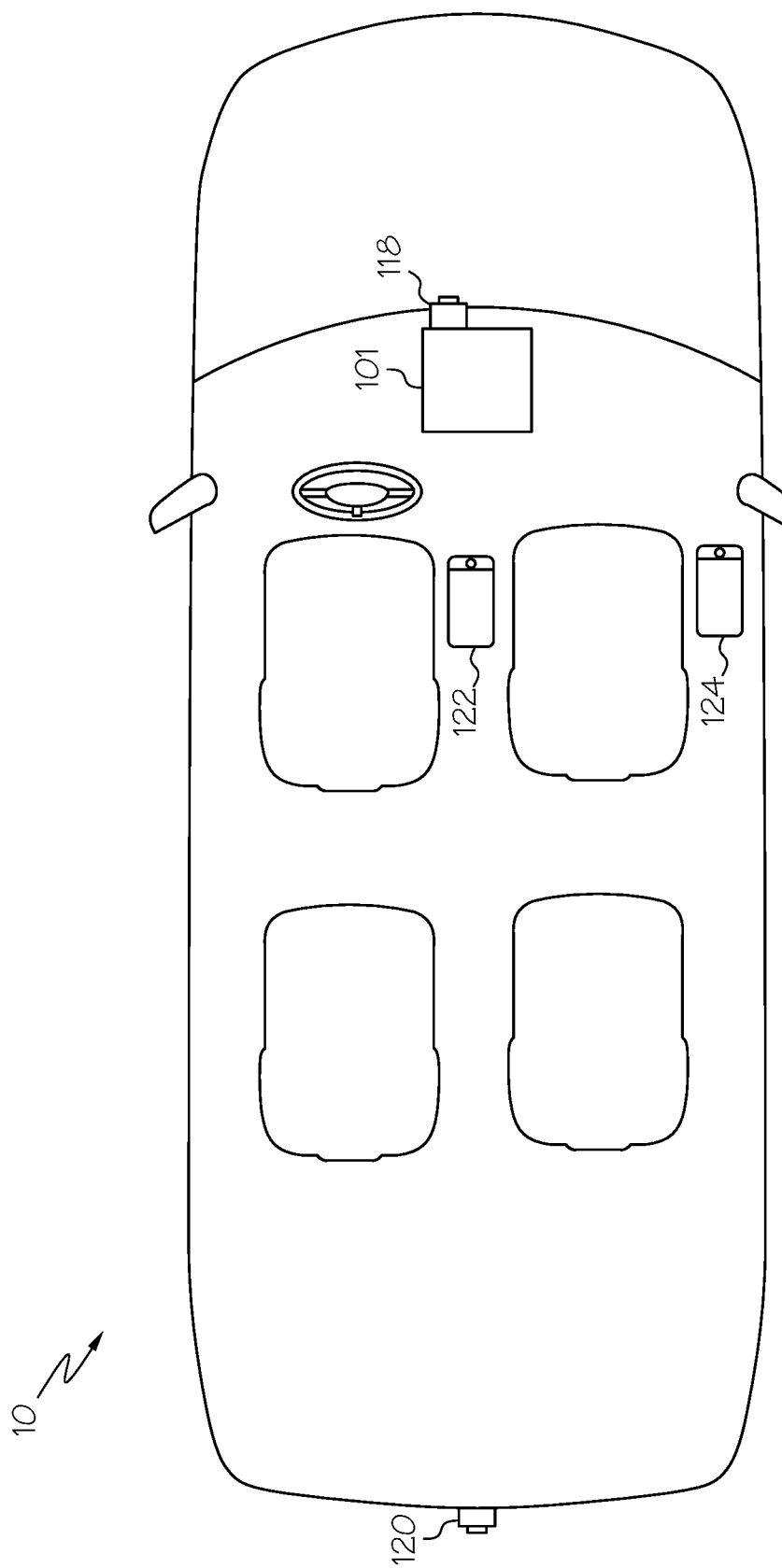
FIG. 1 schematically depicts a vehicle communicating with mobile computing devices, according to one or more embodiments shown and described herein.
Figure 2:
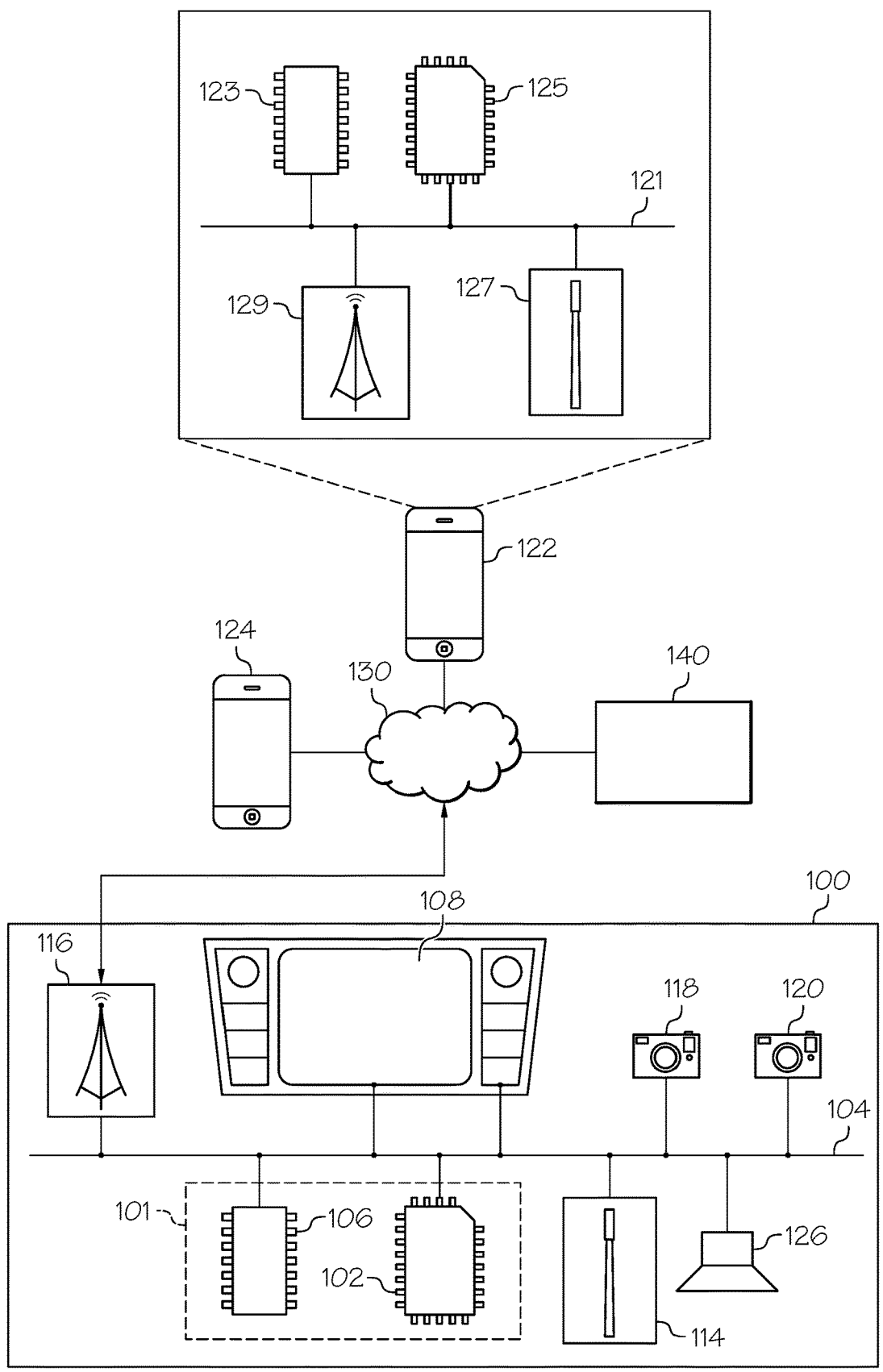
FIG. 2 schematically depicts a vehicle system, according to one or more of embodiments shown and described herein.

The embodiments disclosed herein include vehicle systems utilizing computing resources of external computing devices. Referring generally to FIGS. 1 and 2, a system includes a vehicle comprising one or more imaging devices configured to capture one or more images, and a first mobile computing device communicatively coupled to the vehicle. The first mobile computing device includes one or more processors; one or more memory modules; machine readable and executable instructions that, when executed by the one or more processors, cause the first mobile computing device to: receive the one or more images including an external object from the vehicle; process the image to determine an identification of the external object; and transmit information about the identification of the external object to a remote server or the vehicle. The vehicle compares available computing resources of the vehicle to available computing resources of the first mobile computing device, and transmits the one or more images captured by one or more imaging devices to the first mobile computing device based on the comparison (e.g., in response determining that the available computing resources of the onboard computing device is smaller than the available computing resources of the first mobile computing device). Because the vehicle utilizes the computing resources of external mobile computing devices, and receives processed data from the mobile computing devices, even if the vehicle has very few or no available computing resources, it can perform high-end features, such as autonomous driving, external object recognition, and the like.

Referring to FIG. 1, a vehicle 10 that utilizes computing resources of one or more mobile computing devices is depicted, according to one or more embodiments shown and described herein. The vehicle 10 includes an electronic control unit (ECU) 101 that may communicate with other components of the vehicle 10, e.g., an imaging device 118 and/or an imaging device 120. The ECU 101 includes one or more processors 102 and one or more memory modules 106 (FIG. 2). The details of the ECU 101 will be described below with reference to FIG. 2.

The imaging device 118 may be a forward facing camera placed at the front of the vehicle 10 (e.g., at the windshield of the vehicle 10). The imaging device 118 may capture images of a front view of the vehicle 10. The imaging device 120 may be a rear facing camera place at the back of the vehicle 10. The imaging device 120 may capture images of a rear view of the vehicle 10. While FIG. 1 depicts two imaging devices 118 and 120, the vehicle 10 may include less than or more than two imaging devices. For example, the vehicle 10 may include only one imaging device (e.g., the imaging device 118). As another example, the vehicle 10 may include additional imaging devices at the side of the vehicle 10. The details of the imaging devices will be described below with reference to FIG. 2.

In embodiments, the ECU 101 may communicate with one or more mobile computing devices, e.g., a first mobile computing device 122 and a second mobile computing device 124. The first mobile computing device 122 and the second mobile computing device 124 may provide information about their available computing resources to the ECU 101. Based on the information about the available computing resources of the first mobile computing device 122 and the second mobile computing device 124, the ECU 101 may allocate tasks to the first mobile computing device 122 and the second mobile computing device 124. For example, the ECU 101 may allocate image processing tasks to the mobile computing devices based on the information about available computing resources. The ECU 101 may transmit images captured by the imaging device 118 to the first mobile computing device 122. The first mobile computing device 122 may perform imaging processing on the images and extract information from the images. Then, the first mobile computing device 122 may return the extracted information to the ECU 101.

In some embodiments, each of the imaging devices is exclusively dedicated to one of the mobile computing devices. For example, the imaging device 118 is exclusively communicating with the first mobile computing device 122 and the imaging device 120 is exclusively communicating with the second mobile computing device 124. Based on the number of mobile computing devices within the vehicle 10, the vehicle 10 may increase available computing resources for performing image processing by communicating with the mobile computing devices.

Referring now to FIG. 2, an embodiment of a vehicle system 100 is schematically depicted. It is noted that, while the vehicle system 100 is depicted in isolation, the vehicle system 100 may be included within a vehicle in some embodiments, for example, within the vehicle 10 of FIG. 1. In embodiments in which the vehicle system 100 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The vehicle system 100 includes one or more processors 102. Each of the one or more processors 102 may be any device capable of executing machine readable and executable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth®, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 100 includes one or more memory modules 106 coupled to the communication path 104. The one or more memory modules 106 may comprise RAM, ROM, flash memories, hard drives, or any device capable of storing machine readable and executable instructions such that the machine readable and executable instructions can be accessed by the one or more processors 102. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 106. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 100 comprises a display 108 for providing visual output such as, for example, maps, navigation, entertainment, data received from an external device, or a combination thereof. The display 108 may output one of map, navigation, entertainment, and data received from an external device in response to a selection of corresponding function. The display 108 may be coupled to the communication path 104. Accordingly, the communication path 104 communicatively couples the display 108 to other modules of the vehicle system 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display. Accordingly, the display 108 may receive mechanical input directly upon the optical output provided by the display.

The vehicle system 100 comprises a satellite antenna 114 coupled to the communication path 104 such that the communication path 104 communicatively couples the satellite antenna 114 to other modules of the vehicle system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106. In some embodiments, the vehicle system 100 does not include the satellite antenna 114.

Still referring to FIG. 2, in some embodiments, the vehicle system 100 may be communicatively coupled to a remote server 140 (e.g., a social media network server) by a network 130. In one embodiment, the network 130 may include one or more computer networks (e.g., a personal area network, a local area network, or a wide area network), cellular networks, satellite networks and/or a global positioning system and combinations thereof. Accordingly, the vehicle system 100 can be communicatively coupled to the network 130 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, Zig-Bee, and/or other near field communication protocols. Suitable cellular networks include, but are not limited to, technologies such as LTE, WiMAX, UMTS, CDMA, and GSM.

Still referring to FIG. 1, the vehicle system 100 comprises network interface hardware 116 for communicatively coupling the vehicle system 100 to the server 140. The network interface hardware 116 can be communicatively coupled to the communication path 104 and can be any device capable of transmitting and/or receiving data via a network. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth® wireless communication protocol. Some embodiments may not include the network interface hardware 116.

Still referring to FIG. 1, the vehicle system 100 may further comprise the imaging device 118. The imaging device 118 is coupled to the communication path 104 and communicatively coupled to the one or more processors 102. The imaging device 118 may be any device having an array of sensing devices (e.g., pixels) capable of detecting radiation in an ultraviolet wavelength band, a visible light wavelength band, or an infrared wavelength band. The imaging device 118 may have any resolution. The imaging device 118 may include an omni-directional camera, or a panoramic camera. In some embodiments, one or more optical components, such as a mirror, fish-eye lens, or any other type of lens may be optically coupled to the imaging device 118. The imaging device 118 may be a forward facing camera configured to capture a front view of the vehicle, as for example, as shown in FIG. 1. The imaging device 118 may transmit the captured images to the one or more memory modules 106 or transmit to external devices, e.g., the first mobile computing device 122 or the second mobile computing device 124 such that the first mobile computing device 122 or the second mobile computing device 124 implements image processing on the captured images to extract information on the images.

Still referring to FIG. 1, the vehicle system 100 may further comprise the imaging device 120. The imaging device 120 is coupled to the communication path 104 and communicatively coupled to the one or more processors 102. In some embodiments, the imaging device 120 is similar to the imaging device 118. The imaging device 120 may be a backup camera configured to capture a rear view of the vehicle, as for example, as shown in FIG. 1. The imaging device 120 may transmit the captured images to the one or more memory modules 106 or transmit to external devices, e.g., the first mobile computing device 122 or the second mobile computing device 124 such that the first mobile computing device 122 or the second mobile computing device 124 implements image processing on the captured images to extract information on the images.

In embodiments, the vehicle system 100 includes the speaker 126 for transforming data signals into mechanical vibrations, such as in order to output audible prompts or audible information to a driver of the vehicle. The speaker 126 is coupled to the communication path 104 and communicatively coupled to the ECU 101.

Still referring to FIG. 1, the vehicle system 100 is communicatively coupled to the first mobile computing device 122. For example, the vehicle system 100 may be communicatively coupled to the first mobile computing device 122 via the network 130. As described above, the network 130 may include one or more computer networks (e.g., a personal area network, a local area network, or a wide area network), cellular networks, satellite networks and/or a global positioning system and combinations thereof. In some embodiments, the first mobile computing device 122 is coupled to the communication path 104 such that the communication path 104 communicatively couples the first mobile computing device 122 to other modules of the vehicle system 100. The first mobile computing device 122 may include, without limitation, a smartphone, a tablet, a personal media player, or any other electric device that includes wireless communication functionality. In some embodiments, the first mobile computing device 122 may be plugged in to the vehicle 10 and communicate with components of the vehicle system 100 via a wired connection.

The first mobile computing device 122 includes one or more processors 123 and one or more memory modules 125. Each of the one or more processors 123 may be any device capable of executing machine readable and executable instructions. Accordingly, each of the one or more processors 123 may be a controller, an integrated circuit, a microchip, a computer, or any other computing device. The one or more processors 123 are coupled to a communication path 121 that provides signal interconnectivity between various modules of the first mobile computing device 122. Accordingly, the communication path 121 may communicatively couple any number of processors 123 with one another, and allow the modules coupled to the communication path 121 to operate in a distributed computing environment.

The communication path 121 may be formed from any medium that is capable of transmitting a signal such as, for example, conductive wires, conductive traces, optical waveguides, or the like. In one embodiment, the communication path 121 comprises a combination of conductive traces, conductive wires, connectors, and buses that cooperate to permit the transmission of electrical data signals to components such as processors, memories, sensors, input devices, output devices, and communication devices. Accordingly, the communication path 121 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 125 are coupled to the communication path 121. The one or more memory modules 125 may comprise RAM, ROM, flash memories, hard drives, or any device capable of storing machine readable and executable instructions such that the machine readable and executable instructions can be accessed by the one or more processors 123. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 125. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 125 may include image processing algorithms. The one or more processors 123 may implement the image processing algorithms on received images. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The first mobile computing device 122 comprises network interface hardware 129 for communicatively coupling the first mobile computing device 122 to the vehicle system 100. The network interface hardware 129 can be communicatively coupled to the communication path 121 and can be any device capable of transmitting and/or receiving data via a network. Accordingly, the network interface hardware 129 can include a communication transceiver for sending and/or receiving any wired or wireless communication. For example, the network interface hardware 129 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 129 includes hardware configured to operate in accordance with the Bluetooth® wireless communication protocol.

The first mobile computing device 122 comprises a satellite antenna 127 coupled to the communication path 121 such that the communication path 121 communicatively couples the satellite antenna 127 to other modules of the first mobile computing device 122. The satellite antenna 127 is configured to receive signals from global positioning system satellites. Specifically, in one embodiment, the satellite antenna 127 includes one or more conductive elements that interact with electromagnetic signals transmitted by global positioning system satellites. The received signal is transformed into a data signal indicative of the location (e.g., latitude and longitude) of the satellite antenna 127 or an object positioned near the satellite antenna 127, by the one or more processors 123.

The vehicle system 100 may be coupled to the second mobile computing device 124. For example, the vehicle system 100 may be communicatively coupled to the second mobile computing device 124 via the network 130. The second mobile computing device 124 includes one or more processors, one or more memory modules, a satellite antenna, and network interface hardware that are similar to the one or more processors 123, one or more memory modules 125, a satellite antenna 127, and network interface hardware 129 of the first mobile computing device 122.

Figure 3:
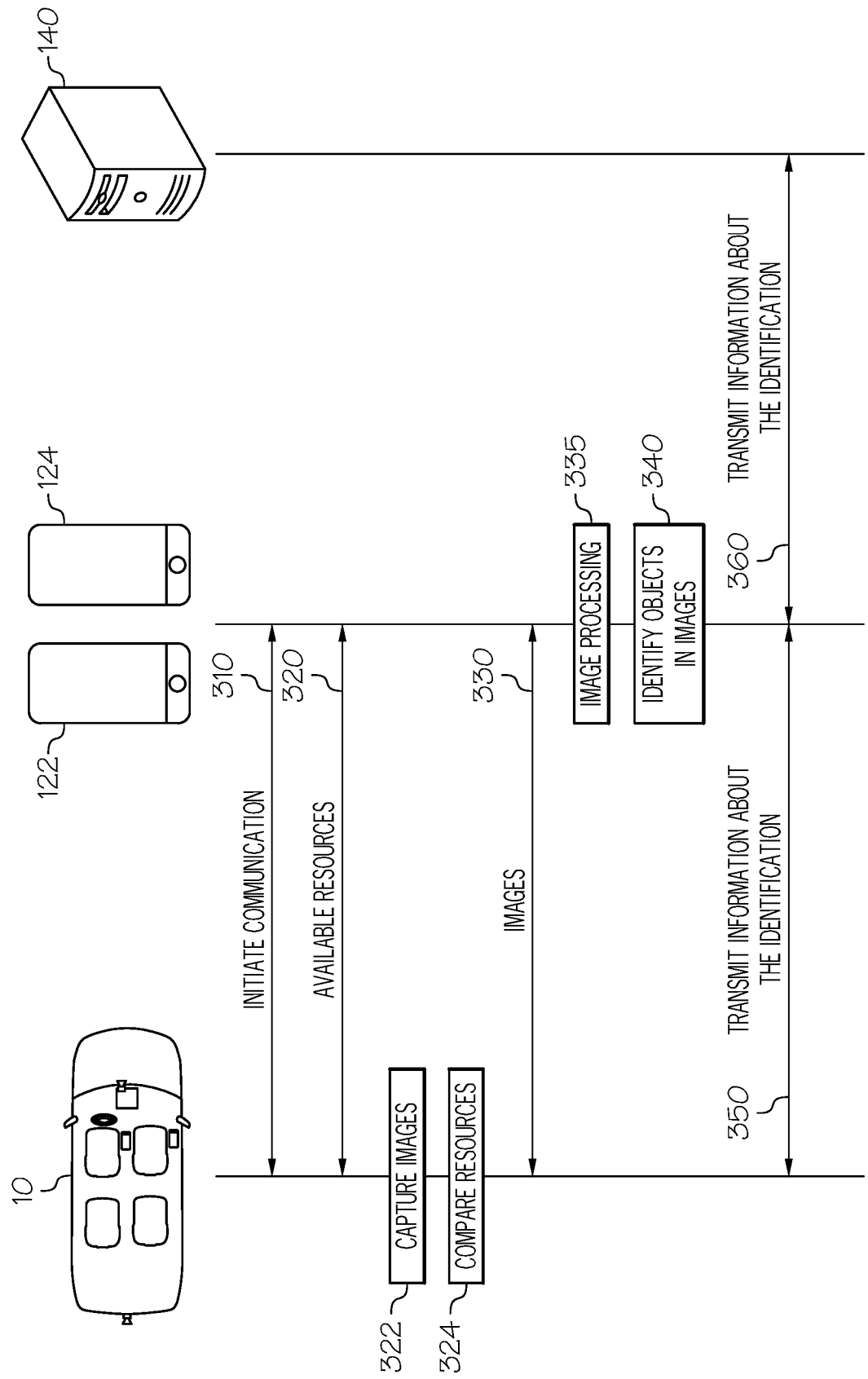
FIG. 3 depicts a flowchart for communication among a vehicle, mobile computing devices, and a remote server in accordance with one or more embodiments shown and described herein.

FIG. 3 depicts a flowchart for image processing by a mobile computing device within a vehicle, according to one or more embodiments shown and described herein.

In step 310, the vehicle 10 and the first mobile computing device 122 and/or the second mobile computing device 124 initiate communication. In embodiments, the first mobile computing device 122 and/or the second mobile computing device 124 may be wirelessly connected to the vehicle 10 via WiFi, Bluetooth®, Near Field Communication (NFC) and the like.

In some embodiments, the first mobile computing device 122 and/or the second mobile computing device 124 stores an application for communicating with the vehicle 10, and when the user of the first mobile computing device 122 and/or the second mobile computing device 124 executes the application, the first mobile computing device 122 and/or the second mobile computing device 124 wirelessly connects to the vehicle 10. In some embodiments, the first mobile computing device 122 and/or the second mobile computing device 124 may be plugged into the vehicle 10 via a wire. When the first mobile computing device 122 and/or the second mobile computing device 124 is plugged in, the first mobile computing device 122 and/or the second mobile computing device 124 and the vehicle 10 initiate communication.

In step 320, the first mobile computing device 122 and/or the second mobile computing device 124 transmits information about its available computing resources to the vehicle 10. For example, each of the first mobile computing device 122 and the second mobile computing device 124 may transmit information about capabilities and/or available resources of CPU and/or GPU, available resources of memory modules, etc. In some embodiments, the information about available computing resources may include a percentage of computing power that is free, a numerical indication of an amount of computing that can be performed, or the like.

In step 322, the vehicle 10 captures images using imaging devices. For example, the vehicle 10 may capture images of a front view and/or a rear view of the vehicle 10 using the respective imaging devices 118 and 120 in FIG. 1. In step 324, the vehicle 10 compares available computing resources of the vehicle 10 to available computing resources of the first mobile computing device 122. In embodiments, the vehicle 10 may determine whether or not to transmit captured images to the mobile computing device based on the comparison. In some embodiments, the comparison may be between a percentage of computing resources of the vehicle 10 that is currently available and a percentage of computing resources of the first mobile computing device 122 that is currently available. In some embodiments, the comparison may be between an amount of computing resources of the vehicle 10 that is currently available and an amount of computing resources of the first mobile computing device 122 that is currently available. In some embodiments, the comparison may be between a quantity of computing that can be completed in a specified time by the vehicle 10 and a quantity of computing that can be completed in the specified time by the first mobile computing device 122 given the current respective computing capabilities and computing workloads of the vehicle 10 and the first mobile computing device 122. Similarly, the vehicle may compare available computing resources of the vehicle 10 to available computing resources of the second mobile computing device 124.

In step 330, the vehicle 10 transmits captured images to the first mobile computing device 122 based on the comparison of the available computing resources of the vehicle 10 and the available computing resources of the first mobile computing device 122. For example, in some embodiments, the vehicle 10 transmits captured images to the first mobile computing device 122 in response to determining that the available computing resources of the vehicle 10 is smaller than the available computing resources of the first mobile computing device 122. For example, if the vehicle 10 does not include a GPU but the first mobile computing device 122 includes a GPU, the vehicle 10 determines that the images need to be processed by the first mobile computing device 122 and transmits the captured images to the first mobile computing device 122. As another example, if the vehicle 10 and the first mobile computing device 122 both include a GPU, but the available computing resources of the GPU of the first mobile computing device 122 is greater than the available computing resources of the GPU of the vehicle 10, the vehicle 10 determines that the images need to be processed by the first mobile computing device 122 and transmits the captured images to the first mobile computing device 122. As another example, the computing resources of the GPU of the vehicle 10 may be used for other functions, e.g., autonomous driving, and available computing resources of the GPU of the vehicle 10 may be relatively small compared to available computing resources of the first mobile computing device 122. In this case, the vehicle 10 may transmit images to the first mobile computing device 122 such that the first mobile computing device 122 may perform imaging processing on the images.

In step 335, the first mobile computing device 122 and/or the second mobile computing device 124 performs image processing on the received images. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

Figure 4:
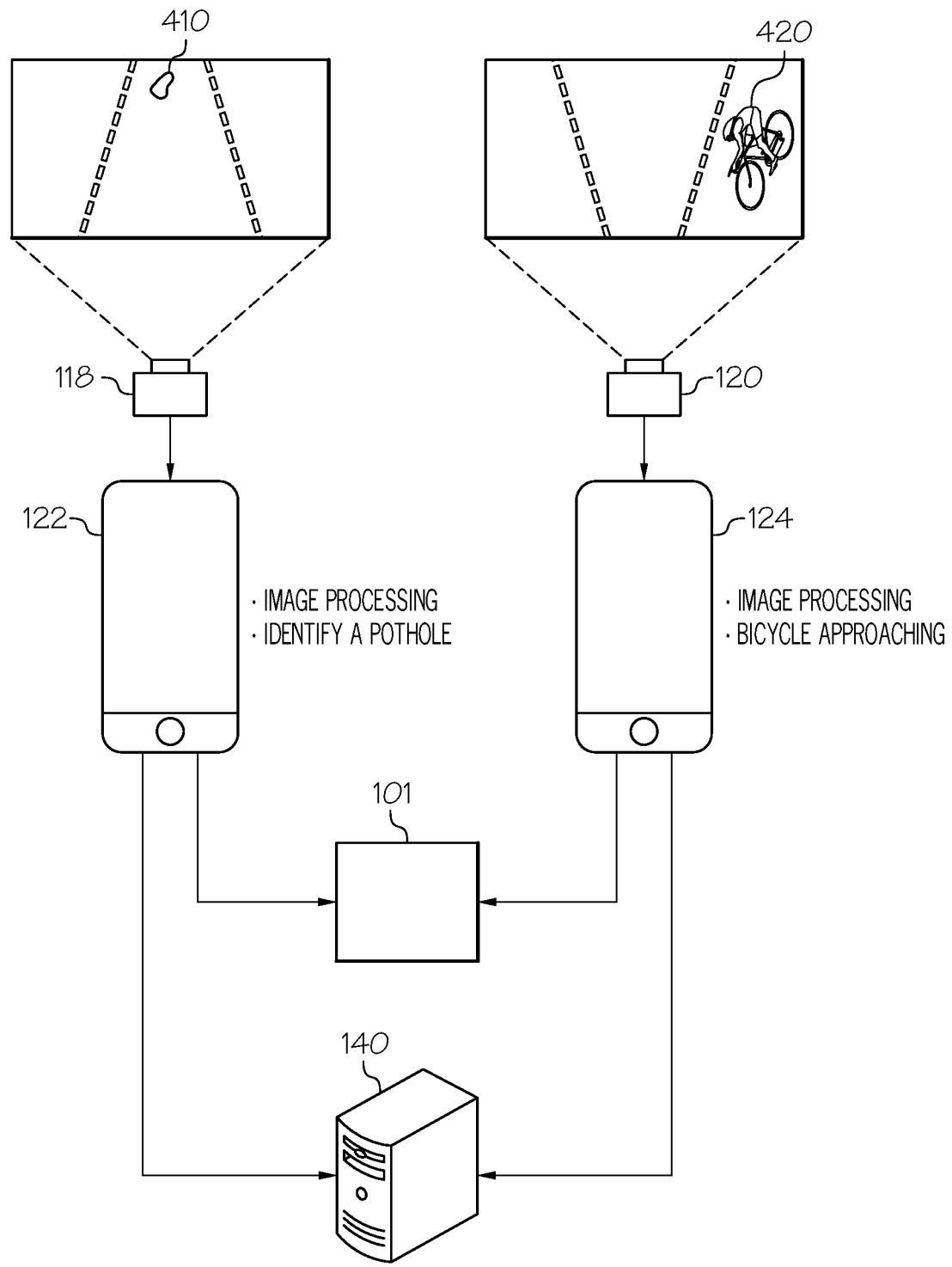
FIG. 4 depicts mobile computing devices processing images from a vehicle in accordance with one or more embodiments shown and described herein.

In step 340, the first mobile computing device 122 and/or the second mobile computing device 124 identifies one or more objects in the received images. For example, referring to FIG. 4, the imaging device 118 may capture an image of the front view of the vehicle 10 and transmit the captured image to the first mobile computing device 122. The first mobile computing device 122 may perform image processing on the captured image and identify a pothole 410 in the image. While FIG. 4 depicts a pothole on the road, any other obstacle, such as a dead animal, a bump, debris, a tire, etc., may be captured and identified by the first mobile computing device 122. The imaging device 120 may capture an image of the rear view and transmit the captured image to the second mobile computing device 124. The second mobile computing device 124 may perform image processing on the captured image and identify a person riding a bicycle 420.

Returning to FIG. 3, in step 350, the first mobile computing device 122 and/or the second mobile computing device 124 transmits information about the identified object to the vehicle 10. For example, referring again to FIG. 4, the first mobile computing device 122 may transmit information about the identified pothole to the ECU 101 of the vehicle 10. The second mobile computing device 124 may transmit information about the identified bicycle to the ECU 101 of the vehicle 10. In some embodiments, the first mobile computing device 122 and/or the second mobile computing device 124 may transmit, to the vehicle 10, an instruction for outputting the information about the identification of the external object. For example, the first mobile computing device 122 may instruct the display 108 to display information about the identified pothole 410 in front of the vehicle. In response to the instruction, the display 108 may display a warning stating "A pothole is ahead. Be careful." As another example, the second mobile computing device 124 may instruct the speaker 126 to output an audible warning regarding the object. In response to the instruction, the speaker 126 may output an audible warning "A bicycle is approaching. Be careful."

Returning to FIG. 3, in step 360, the first mobile computing device 122 and/or the second mobile computing device 124 transmits information about the identified object to the remote server 140. For example, referring again to FIG. 4, the first mobile computing device 122 may transmit information about the identified pothole to the remote server 140. The second mobile computing device 124 may transmit information about the identified bicycle to the remote server 140.

Figure 5A:
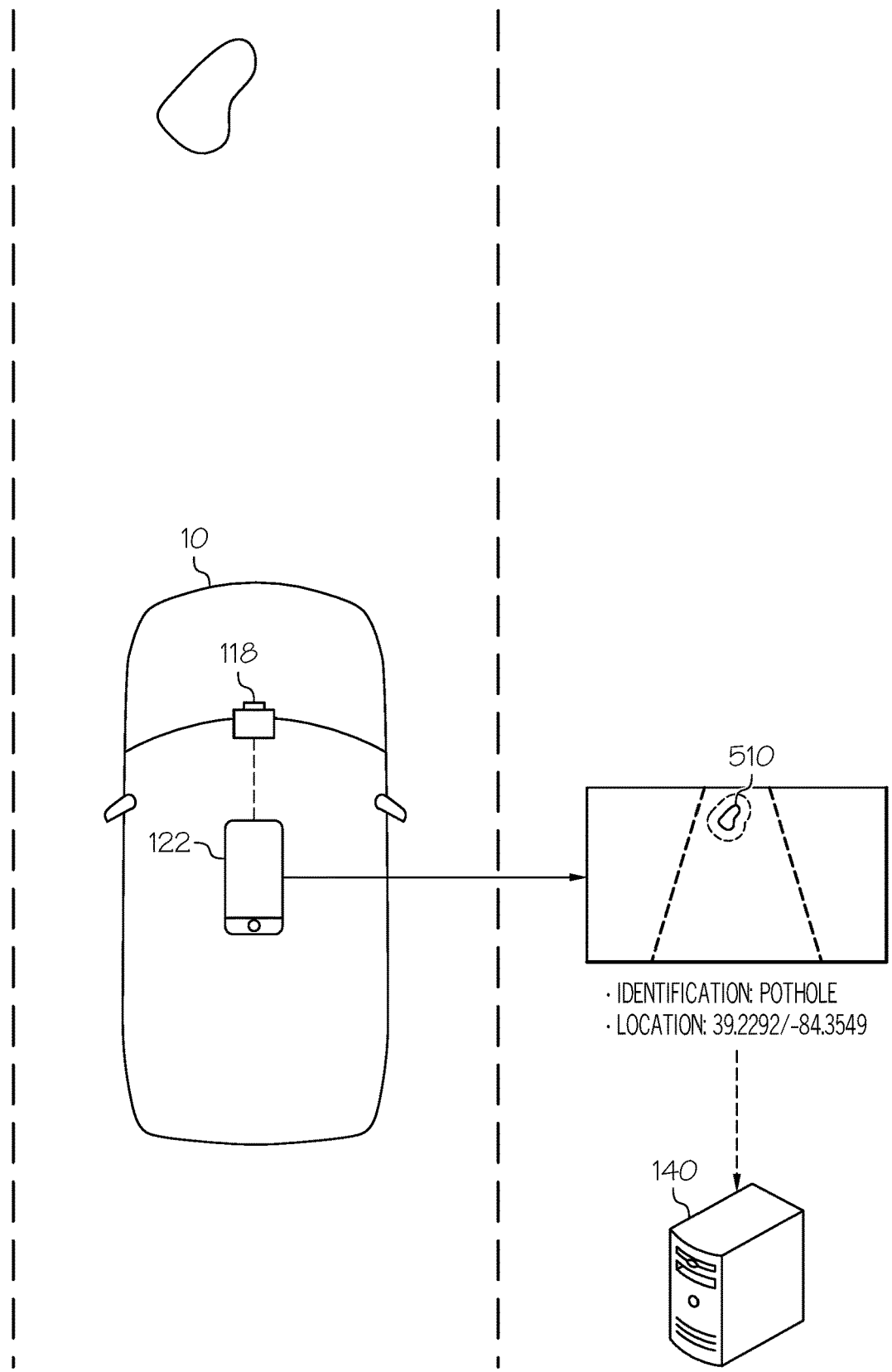
FIG. 5A depicts a mobile computing device processing an image from a vehicle and locating an external object in the image in accordance with one or more embodiments shown and described herein.

In some embodiments, the first mobile computing device 122 and/or the second mobile computing device 124 transmits information about the identified object along with other information related to the identified object to the remote server 140. Referring now to FIG. 5A, the imaging device 118 may capture an image of a front view of the vehicle 10 including a pothole 510 and transmit the captured image to the first mobile computing device 122. The first mobile computing device 122 performs imaging processing on the captured image and identifies the pothole 510. Additionally, the first mobile computing device 122 may determine the location of the pothole 510 using the satellite antenna 127. For example, the first mobile computing device 122 may determine the current location of the first mobile computing device 122 using the satellite antenna 127 when it receives the captured image from the imaging device 118. Once the pothole 510 is identified in the received image, the first mobile computing device 122 may determine the location of the pothole 510 based on the location of the first mobile computing device 122 and a distance between the first mobile computing device 122 and the pothole 510. Then, the first mobile computing device 122 may transmit information about the identified pothole 510 along with the location of the pothole 510 to the remote server 140.

Figure 5B:
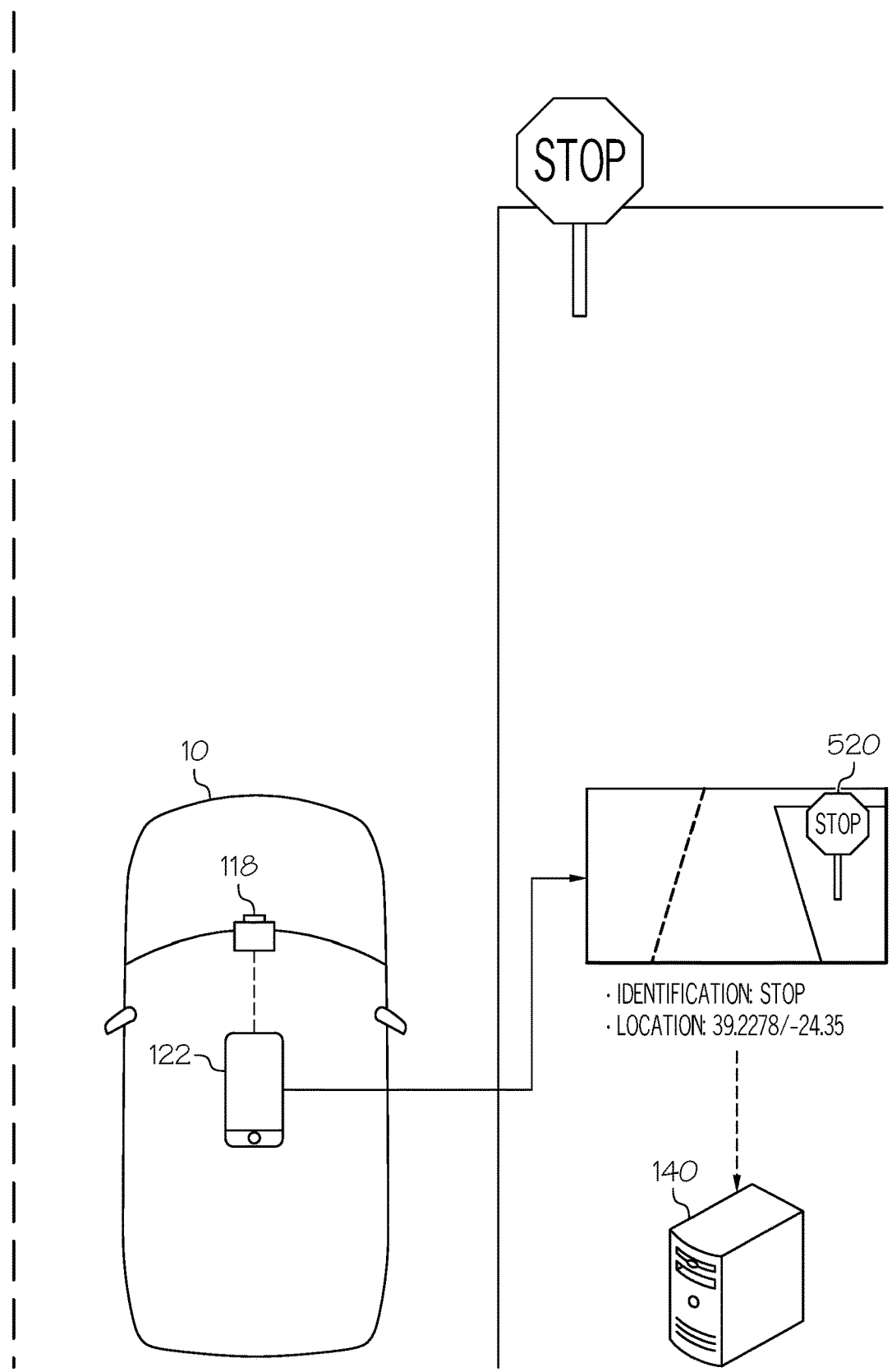
FIG. 5B depicts a mobile computing device processing an image from a vehicle and locating an external object in the image in accordance with one or more embodiments shown and described herein.

Referring to FIG. 5B, the imaging device 118 may capture an image of a front view of the vehicle 10 including a stop sign 520 and transmit the captured image to the first mobile computing device 122. The first mobile computing device 122 performs imaging processing on the captured image and identifies the stop sign 520. Additionally, the first mobile computing device 122 determines the location of the stop sign 520 using the satellite antenna 127. For example, the first mobile computing device 122 determines the current location of the first mobile computing device 122 using the satellite antenna 127 when it receives the captured image from the imaging device 118. Once the stop sign 520 is identified in the received image, the first mobile computing device 122 may determine the location of the stop sign 520 based on the location of the first mobile computing device 122 and a distance between the first mobile computing device 122 and the stop sign 520. Then, the first mobile computing device 122 may transmit information about the stop sign 520 along with the location of the stop sign 520 to the remoter server 140. Based on the information on identified objects and the locations thereof, the remote server 140 may update a map with the received information.

While the above disclosure describes transmitting images from a vehicle to mobile computing devices in the vehicle, other data about the vehicle may be transmitted to the mobile computing devices such that the mobile computing devices process the data and return processed data to the vehicle or transmit the processed data to a remote server. For example, based on the comparison of available computing resources of the vehicle 10, the first mobile computing device 122, and the second mobile computing device 124, the vehicle 10 may transmit vehicle driving data including velocity, rpm, gear transmission, fuel efficiency, state of charge, etc. to the first mobile computing device 122. The first mobile computing device 122 may include an application for analyzing and evaluating vehicle driving based on the raw data received from the vehicle. The first mobile computing device 122 may execute the application to evaluate the driving of the vehicle based on data received from the vehicle 10 and return a driving score to the vehicle, save the score locally, or transmit the score to the remote server 140. As another example, based on the comparison of available computing resources of the vehicle 10, the first mobile computing device 122, and the second mobile computing device 124, the vehicle 10 may transmit diagnostic trouble codes (DTCs) to the first mobile computing device 122. The first mobile computing device 122 may include an application for analyzing DTCs to identify issues with a vehicle. The first mobile computing device 122 may execute the application to analyze the DTCs and identify which component of the vehicle has issues and return information about the issue to the vehicle, or transmit the information about the issue to the remote server 140. Some embodiments may determine which of the first mobile computing device 122 and the second mobile computing device 124 to transmit the images or other information for further processing based on the available computing resources and/or relative processing load of the first mobile computing device 122 and the second mobile computing device 124. For example, if the first mobile computing device 122 transmits information to the vehicle 10 indicating that the first mobile computing device 122 has a first amount of available computing resources and the second mobile computing device 124 transmits information to the vehicle 10 indicating that the second mobile computing device 122 has a second amount of available computing resources (which is less than the first amount of available computing resources), the vehicle 10 may determine to transmit the images or other information for further processing to the first mobile computing device 122 because it has more available computing resources than the second mobile computing device 124.

The system described herein includes a vehicle comprising one or more imaging devices configured to capture one or more images, and a first mobile computing device communicatively coupled to the vehicle. The first mobile computing device includes one or more processors; one or more memory modules; machine readable and executable instructions that, when executed by the one or more processors, cause the first mobile computing device to: receive the one or more images including an external object from the vehicle; process the image to determine an identification of the external object; and transmit information about the identification of the external object to a remote server or the vehicle. The vehicle compares available computing resources of the vehicle to available computing resources of the first mobile computing device, and transmits the one or more images captured by one or more imaging devices to the first mobile computing device based on the comparison (e.g., in response to determining that the available computing resources of the onboard computing device is smaller than available computing resources of the first mobile computing device). Because the vehicle utilizes the computing resources of external mobile computing devices, and receives processed data from the mobile computing devices, even if the vehicle has very few or no available computing resources, it can perform high-end features such as autonomous driving, external object recognition.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
one or more imaging devices configured to capture one or more images; and
an electronic control unit configured to:
initiate communication with a first mobile computing device placed in the vehicle;
receive information about available computing resources of the first mobile computing device;
compare available computing resources of the vehicle to the available computing resources of a first mobile computing device; and
transmit the captured one or more images to the first mobile computing device based on the comparison of the available computing resources of the vehicle and the available computing resources of the first mobile computing device.

2. The vehicle of claim 1, wherein the electronic control unit is configured to:
receive information about an identification of an external object from the first mobile computing device; and
output the information about the identification of the external object.

3. The vehicle of claim 1, wherein the electronic control unit is configured to:
receive a location of the external object to from the first mobile computing device.

4. The vehicle of claim 1, wherein the electronic control unit is configured to:
receive available computing resource information of the first mobile computing device and available computing resource information of a second mobile computing device; and
allocate the one or more images captured by the one or more imaging devices to the first mobile computing device and the second mobile computing device based on the available computing resource information of the first mobile computing device and the available computing resource information of the second mobile computing device.

5. The vehicle of claim 4, wherein:
the one or more imaging devices include a forward facing camera and a rearward facing camera;
the forward facing camera transmits captured images to the first mobile computing device; and
the rearward facing camera transmits captured images to the second mobile computing device.

6. The vehicle of claim 1, wherein the electronic control unit is configured to:
transmit diagnostic codes to the first mobile computing device; and
receive information on a status of the vehicle from the first mobile computing device.

7. A vehicle comprising:
one or more imaging devices configured to capture one or more images; and
an electronic control unit configured to:
initiate communication with a first mobile computing device placed in the vehicle;
capture images with the one or more imaging devices;
receive information about available computing resources of the first mobile computing device;
compare a quantity of computing that is completed in a specified time by the vehicle and a quantity of computing that is completed in the specified time by the first mobile computing device based on available computing resources and computing workloads of the vehicle and the available computing resources and computing workloads of the first mobile computing device; and
transmit the one or more images captured by the one or more imaging devices to the first mobile computing device based on the comparison of the quantity of computing that is completed in the specified time by the vehicle and the quantity of computing that is completed in the specified time by the first mobile computing device.

8. The vehicle of claim 7, wherein the electronic control unit is configured to:
receive information about an object in the one or more images from the first mobile computing device.

9. The vehicle of claim 8, wherein:
the one or more imaging devices include a forward facing camera and a rearward facing camera;
the forward facing camera transmits captured images to the first mobile computing device; and
the rearward facing camera transmits captured images to a second mobile computing device in the vehicle.

10. A method for imaging processing by a mobile computing device, the method comprising:
initiating, by the mobile computing device, communication with a vehicle;
transmitting, by the mobile computing device, information about available computing resources of the mobile computing device to the vehicle;
comparing, by an electronic control unit of the vehicle, available computing resources of the vehicle to the available computing resources of the mobile computing device;
transmitting, by the electronic control unit of the vehicle, one or more images to the mobile computing device based on the comparison of the available computing resources of the vehicle and the available computing resources of the mobile computing device;
receiving, by the mobile computing device, the one or more images transmitted from the electronic control unit of the vehicle;
processing, by one or more processors of the mobile computing device, the one or more images to determine an identification of an external object in the one or more images; and
transmitting, by the mobile computing device, information about the identification of the external object to a remote server.

11. The method of claim 10, further comprising:
initiating, by the mobile computing device, communication with the vehicle; and
transmitting, by the mobile computing device, information about available computing resources of the mobile computing device to the vehicle.

12. The method of claim 10, further comprising:
determining, by the mobile computing device, a location of the external object based on a current location of the mobile computing device determined by a GPS device of the mobile computing device; and
transmitting, by the mobile computing device, the location of the external object to the remote server.

13. The method of claim 10, further comprising
receiving, by the mobile computing device, diagnostic codes from the vehicle;
processing, by the mobile computing device, the diagnostic codes to determine a status of the vehicle; and
transmitting, by the mobile computing device, information on the status of the vehicle to the vehicle.

14. The vehicle of claim 1, wherein the first mobile computing device is a personal handheld device.

15. The vehicle of claim 1, wherein the first mobile computing device is a mobile device wirelessly communicating with the electronic control unit of the vehicle or plugged into the vehicle.

16. The vehicle of claim 1, wherein the first mobile computing device comprises:
one or more processors;
one or more memory modules; and
machine readable and executable instructions that, when executed by the one or more processors, cause the first mobile computing device to:
receive the one or more images from the electronic control unit of the vehicle;
process the one or more images to determine an identification of an external object in the one or more images; and
transmit information about the identification of the external object to a remote server.

17. The vehicle of claim 1, wherein the electronic control unit is configured to:
compare a percentage of the available computing resources of the vehicle to a percentage of the available computing resources of the first mobile computing device; and
transmit the one or more images captured by the one or more imaging devices to the first mobile computing device based on the comparison of the percentage of the available computing resources of the vehicle and the percentage of the available computing resources of the first mobile computing device.

18. The vehicle of claim 1, wherein the electronic control unit is configured to:
compare a quantity of computing that is completed in a specified time by the vehicle and a quantity of computing that is completed in the specified time by the first mobile computing device based on the available computing resources and computing workloads of the vehicle and the available computing resources and computing workloads of the first mobile computing device; and
transmit the one or more images captured by the one or more imaging devices to the first mobile computing device based on the comparison of the quantity of computing that is completed in a specified time by the vehicle and the quantity of computing that is completed in the specified time by the first mobile computing device.

19. The vehicle of claim 1, wherein the electronic control unit is configured to:
receive information about a GPU of the first mobile computing device from the first mobile computing device; and
transmit the one or more images captured by the one or more imaging devices to the first mobile computing device in response to receiving information about the GPU of the first mobile computing device.

20. The vehicle of claim 1, wherein the electronic control unit is configured to:
compare the available computing resources of a GPU of the vehicle to the available computing resources of a GPU of the first mobile computing device; and
transmit the one or more images captured by the one or more imaging devices to the first mobile computing device based on the comparison of the available computing resources of the GPU of the vehicle and the available computing resources of the GPU of the first mobile computing device.

\* \* \* \* \*